(12) United States Patent
Kanazawa (10) Patent No.: US 8,364,432 B2
(45) Date of Patent: Jan. 29, 2013

(54) ANALOG ANGLE SENSOR ACCURACY CORRECTION PROGRAM CORRECTION METHOD, RECORDING MEDIUM, AND SERVO DRIVER

(75) Inventor: Shouji Kanazawa, Aomori (JP)

(73) Assignee: Tamagawa Seiki Co., Ltd., Aomori (JP)

( * ) Notice: Subject to any disclaimer, the term of this patent is extended or adjusted under 35 U.S.C. 154(b) by 435 days.

(21) Appl. No.: 12/598,647

(22) PCT Filed: Nov. 16, 2007

(86) PCT No.: PCT/JP2007/072310
§ 371 (c)(1),
(2), (4) Date: Jan. 5, 2010

(87) PCT Pub. No.: WO2009/001487
PCT Pub. Date: Dec. 31, 2008

(65) Prior Publication Data
US 2010/0125430 A1    May 20, 2010

(30) Foreign Application Priority Data

Jun. 27, 2007  (JP) ................................. 2007-169803

(51) Int. Cl.
*G01P 21/00* (2006.01)
*G06F 19/00* (2011.01)
(52) U.S. Cl. .......... 702/96; 73/1.37; 73/865.8; 702/105; 702/145; 708/200
(58) Field of Classification Search ................ 73/1.01, 73/1.37, 1.75, 1.79, 432.1, 865.8; 318/490; 700/1, 28, 32, 33, 34, 36, 90, 304; 702/1, 702/33, 85, 86, 88, 96, 105, 127, 142, 145, 702/147; 708/100, 105, 200
See application file for complete search history.

(56) References Cited

FOREIGN PATENT DOCUMENTS

| JP | 62-210515 | | 9/1987 |
|---|---|---|---|
| JP | 10-122031 A | * | 5/1998 |
| JP | 2001-275391 | | 10/2001 |
| JP | 2007-33412 | | 2/2007 |

OTHER PUBLICATIONS

International Search Report mailed Jan. 15, 2008 for International application No. PCT/JP2007/072310.

* cited by examiner

*Primary Examiner* — Edward Cosimano
(74) *Attorney, Agent, or Firm* — Fay Sharp LLP (57) ABSTRACT

A sensor accuracy adjustment program for an analog angle sensor used in an AC servomotor control. A step (S3) of applying an adjustment value update processing to adjustment values in adjustment areas in an adjustment table depending on the result of the comparison of the value of a command rate with the value of the rate of an adjustment processing target by using the adjustment table in which changeable adjustment values used for adjustment calculation are arranged for each of the adjustment areas in which the range of a motor shaft rotation angle is divided for use as a unit of an adjustment processing, a step (S0) of applying the adjustment calculation to the target rate value by using the adjustment values after the update, and a step (S4) for judging the state in which the step (S4) is implemented in order to apply the step (S3) to all the adjustment areas of the adjustment table are functioned to the servo driver.

18 Claims, 9 Drawing Sheets

| n | Adg(n)[°] | Kvcp(n)[×] | A | B |
|---|---|---|---|---|
| 0 | 0 | Kvcp(0) | 1.00610 | #2032h |
| 1 | 30 | Kvcp(1) | 1.0 | #2000h |
| 2 | 60 | Kvcp(2) | 0.99219 | #1fc0h |
| : | : | : | : | : |
| 10 | 300 | Kvcp(10) | 0.99512 | #1fd8h |
| 11 | 330 | Kvcp(11) | 1.00061 | #2005h |

$$V \text{[rpm]} = \frac{Nct \times 60}{Tsv \times Necd} \quad \cdots \langle 1 \rangle$$

$$V \text{[rpm]} = \frac{60}{Tc \times Necd} \quad \cdots \langle 2 \rangle$$

ANALOG ANGLE SENSOR ACCURACY CORRECTION PROGRAM CORRECTION METHOD, RECORDING MEDIUM, AND SERVO DRIVER

TECHNICAL FIELD

The present invention relates to an analog angle sensor accuracy correction program, correction method, recording medium and servo driver, and more particularly, to an analog angle sensor accuracy correction program or the like for an analog angle sensor such as a resolver and analog sine wave encoder used to control a motor such as an AC servo motor, capable of automatically correcting sensor accuracy without a servo driver which drives the motor using any encoder which serves as a reference for others.

BACKGROUND ART

An analog angle sensor such as a resolver is conventionally used as an angle sensor to control an AC servo motor or the like. These sensors send angle information with an analog waveform to a motor control apparatus. Therefore, in order for control software in the control apparatus to use this angle information as a motor angle/speed value, processing of converting the angle information to a digital value is required.

Figure 8:
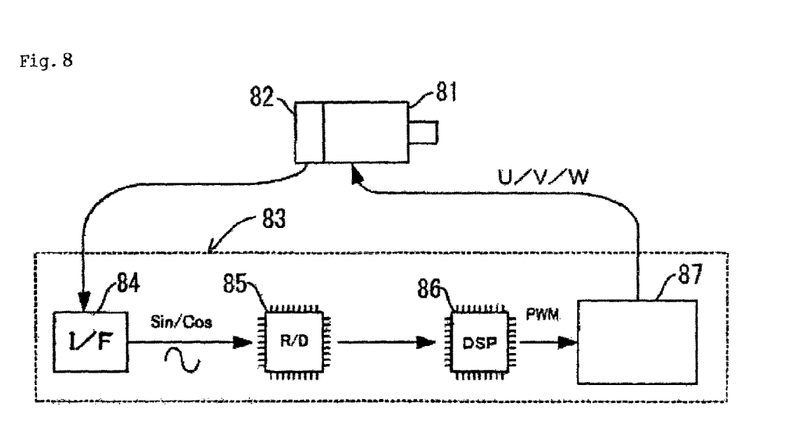
FIG. 8 is a diagram illustrating a conventional common motor drive method (in the case of a resolver sensor) using an analog angle sensor.
Figure 9:
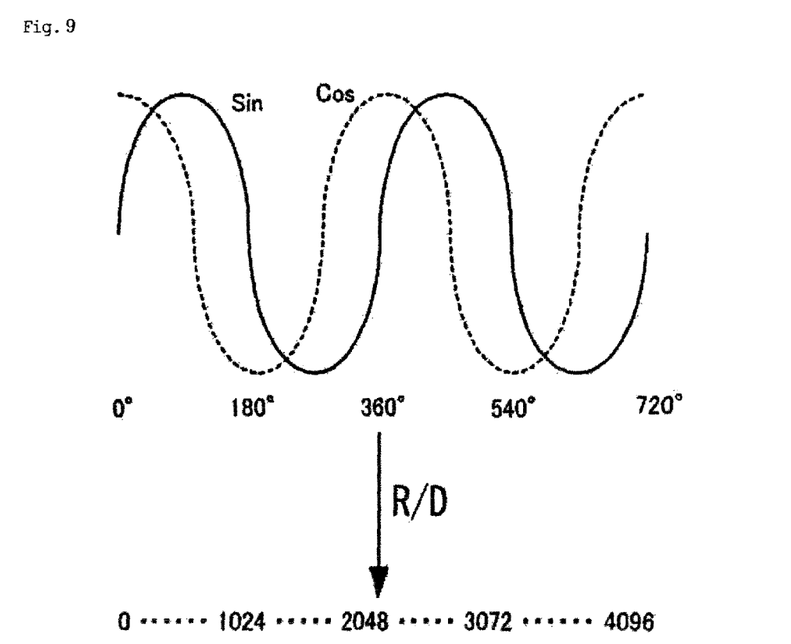
FIG. 9 is a diagram illustrating a digital conversion method for an analog angle sensor waveform according to the motor drive method in FIG. 8.

FIG. 8 illustrates a conventional common motor drive method (in the case of a resolver sensor) using an analog angle sensor. Furthermore, FIG. 9 illustrates a method of converting an analog angle sensor waveform to a digital waveform in the motor drive method in FIG. 8. As shown in FIG. 9, according to the conventional method, angle information detected and generated by an angle sensor 82 is sent to a motor control apparatus 83 (servo driver) with an analog signal, that is, an angle waveform. Such an analog signal (Sin/Cos signal) is sent to an R/D conversion circuit 85 through an interface 84 of a motor control apparatus 83, where it is converted to a digital signal. The digital position information generated is processed by a motor control digital signal processor (DSP) 86, a PWM output is generated and a motor drive circuit 87 is thereby controlled and a motor U/V/W output is fed back to the motor 81. FIG. 9 shows an example of converting angle information of 2048 ct/360° from analog to digital.

In this digital conversion, micro distortion of the analog waveform may cause variations in the count interval of digital values even when the amount of angular movement is the same. This variation is defined as a "pitch error."

Figure 10:
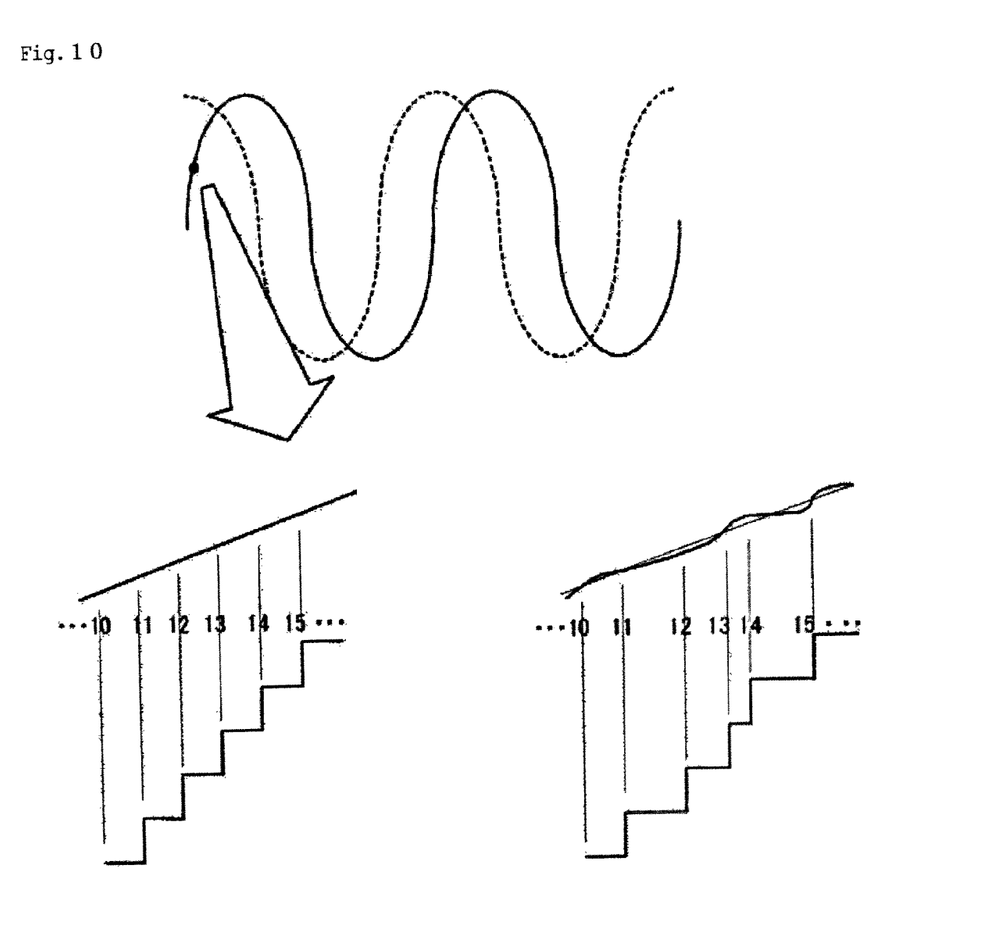
FIG. 10 is a diagram illustrating the reason that a pitch error occurs in the conventional technique.

FIG. 10 illustrates the reason that a pitch error occurs.

In the figure, an analog angle sensor waveform rotating at a constant speed is shown in the upper section, and its micro portion is shown in the bottom section. Furthermore, in the bottom left is the ideal waveform, and in the bottom right is the actual one.

As shown in the figure, When a motor is rotating at a constant speed, if the rotation speed is exactly constant and the analog waveform detected by the analog angle sensor is ideal, digital angle information with a constant count interval=pitch should be obtained by position counting of digital conversion processing as shown at the bottom left of the figure. However, micro distortion actually constantly occurs in the analog waveform and this is reflected and results in digital angle information with a variation in the count interval=pitch as shown at the bottom right of the figure.

A pitch error generated in this way causes a "rampage" in the motor current during motor control.

Figure 11:
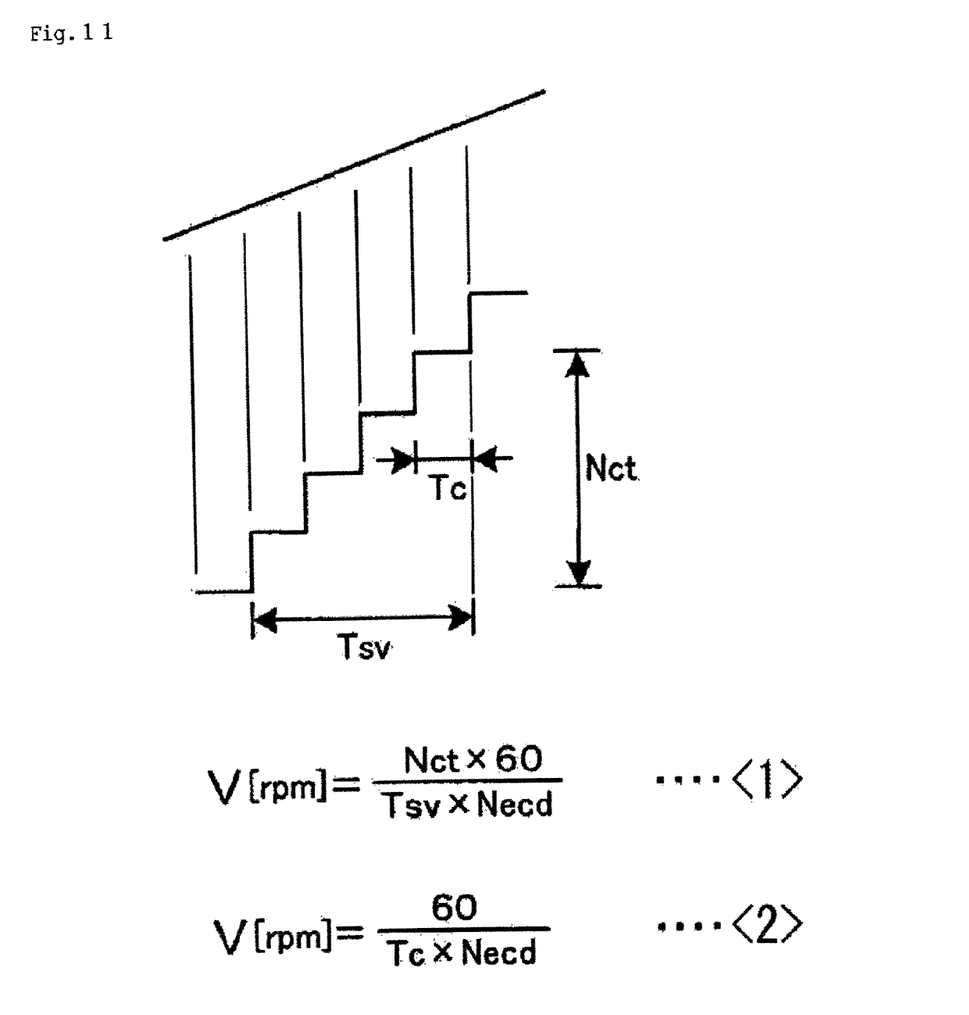
FIG. 11 is a diagram illustrating a conventional common motor speed calculation method carried out by control software of a motor control apparatus.

FIG. 11 illustrates a conventional common motor speed calculation method carried out by control software of the motor control apparatus.

Description of symbols is as follows:

Tc: one-count time (sec)
Tsv: speed calculation period (sec)
Nct: number of counts within speed calculation period
Necd: sensor resolution (number of counts in one revolution of motor).

In the figure, Expression <1> shows a calculation expression based on a count and Expression <2> shows a calculation expression based on a one-count time. As shown in the figure, the conventional motor control apparatus generally uses a method of calculating motor speed using angle information which is a digital value based on a count of the angle information within a certain time or one-count time.

Therefore, when there is a pitch error, the count or one-count time vanes and as a result, the calculated motor speed value is not stable and fluctuates, and the above described rampage occurs when the motor speed is controlled, resulting in a problem that it is not possible to improve control response performance or the like. Therefore, attempts have been conventionally made to reduce or prevent influences of rampage using measures such as reducing a control gain.

Hereinafter, this rampage will be defined as a "current ripple."

On the other hand, improving the accuracy of the angle sensor is essential to improvement of accuracy of motor control and a plurality of technical proposals are conventionally presented and the technique disclosed in Patent Document 1 which will be described later is one of those proposals. This technique samples a plurality of analog signals from a resolver and calculates error parameters for correcting an offset, phase error and amplitude difference using a predetermined calculation expression and corrects a rotation angle value based on the parameters.

[Patent Document 1]: Japanese Patent Application Laid-Open No. 2007-33412 "Error Parameter Extraction Apparatus for Position Detector and Position Detector Having Error Correction Function".

DISCLOSURE OF THE INVENTION

As described above, rampage by pitch errors in controlling the motor speed has been coped with by emergency measures such as reducing a control gain, but an adjustment of a control gain naturally has its limitation. Moreover, when there is a large pitch error, even if the motor rotates at a constant speed, the motor rotation speed which is calculated discretely varies considerably. When the servo driver is performing speed control or position control, if there is a variation in the calculated speed value, an accurate deviation from a speed commanded value cannot be calculated and this may cause the control response speed not to be increased.

As a countermeasure for this problem, there is also a method of averaging the calculated speed value, but such a method takes a considerable time until the calculated speed value converges to the actual speed, which delays the response time for speed calculation, ending up reducing the control response speed. The technology disclosed in above Patent Document 1 considers an offset, phase error and amplitude difference as correction targets, but this cannot cope with a pitch error which is a much more microscopic error.

The problem to be solved by the present invention is to provide an analog angle sensor accuracy correction program, correction method, recording medium and servo driver capable of solving the above described problems of the conventional technology, automatically correcting sensor accuracy of a resolver used for motor control of an AC servo motor or the like or an analog angle sensor such as an analog sine wave encoder, thereby suppressing variations in a calculated motor rotation speed value due to the above described pitch error and thereby effectively preventing the motor control response performance from reducing. The present invention is particularly intended to provide an analog angle sensor accuracy correction program, correction method, recording medium and servo driver capable of displaying such a function without the servo driver which drives the motor using any encoder which serves as a reference for other.

The inventor of the present application has examined the above described problems and has come up with the present invention by discovering that the above described problems can be solved by detecting a variation in a calculated speed value due to a pitch error, calculating a correction value from this variation value and suppressing the variation of the calculated speed value using the correction value. That is, the invention applied for patent in the present application as means for solving the above described problems or the invention at least disclosed therein is as follows.

(1) An analog angle sensor accuracy correction program for servo motor control executable by a servo driver or computer, the program being characterized by causing a servo driver or computer to use a correction table having a structure in which modifiable correction values to be used for correction calculations on a target speed value which will be described later are arranged for each of correction areas resulting from dividing a motor axis rotation angle range to be used as a unit of correction value updating processing which will be described later and execute an area correction value updating step for comparing an initially commanded motor rotation speed, that is, a commanded speed value with a speed targeted for correction processing, that is, a target speed value and applying correction value updating processing to the correction values set in the correction areas in the correction table according to the result thereof, a speed correction step for applying a correction calculation to the target speed value using the correction value updated in the area correction value updating step, and an area processing situation judging step for judging the execution situation of the step for applying the area correction value updating step to all correction areas of the correction table.

(2) An analog angle sensor accuracy correction program for servo motor control executable by a servo driver or computer, the program being characterized by causing a servo driver or computer to use a correction table having a structure in which modifiable correction values to be used for correction calculations on a target speed value which will be described later are arranged for each of correction areas resulting from dividing a motor axis rotation angle range to be used as a unit of correction value updating processing which will be described later and execute an area confirmation necessity judging step for judging whether or not correction value updating processing in the current correction area detected based on position information from an angle sensor is necessary, an area correction value updating step for comparing, when a confirmation in the correction area is judged to be necessary in the area confirmation necessity judging step, an initially commanded motor rotation speed, that is, a commanded speed value with a speed targeted for correction processing, that is, a target speed value and applying correction value updating processing to the correction values set in the correction areas in the correction table according to the result thereof, a speed correction step for applying a correction calculation to the target speed value using the correction value updated in the area correction value updating step, and an area processing situation judging step for judging the execution situation of the step for applying the area correction value updating step to all correction areas of the correction table.

(3) The analog angle sensor accuracy correction program described in (1) or (2), characterized in that in the area correction value updating step, correction value updating processing is applied to the current correction area and another correction area having a certain relationship therewith.

(4) The analog angle sensor accuracy correction program described in (3), characterized in that the correction value updating processing carried out in the area correction value updating step is processing of adding/subtracting a specific unit constant to/from a previously set correction value according to each correction area.

(5) The analog angle sensor accuracy correction program described in (4), characterized in that the other correction area is one correction area adjacent to the current correction area.

(6) The analog angle sensor accuracy correction program described in (5), characterized in that the correction value updating processing is processing of adding the specific unit constant to one correction area adjacent to the current correction area and adding a number with a sign opposite thereto to the other.

(7) The analog angle sensor accuracy correction program described in (6), characterized in that the correction value updating processing is processing that adds, when the target speed value is greater than the commanded speed value in the current correction area, "−|specific unit constant|" to the correction value previously set in the correction area and adds "+|specific unit constant|" to a correction area adjacent thereto, and further adds, when the target speed value is smaller than the commanded speed value, "+|specific unit constant|" to the correction value previously set in the correction area and adds "−|specific unit constant|" to the correction area adjacent thereto.

(8) The analog angle sensor accuracy correction program described in any one of (5) to (7), characterized in that the speed correction step is processing that calculates a speed correction value variable Kvcp based on each correction value subjected to correction value updating processing in the current correction area and adjacent correction area, an area interpolation angle which is an angle of interval between both correction areas and a current motor axis angle obtained from position information from the angle sensor, multiplies a conventional calculation speed variable V obtained from the position information from the angle sensor by the speed correction value variable Kvcp and calculates a corrected calculation speed Vsv.

(9) The analog angle sensor accuracy correction program described in any one of (3) to (8), characterized in that the correction value initially set in the correction table is a number of 0 to 2 inclusive.

(10) The analog angle sensor accuracy correction program described in any one of (1) to (9), characterized in that four or more of the correction areas are provided and all correction areas are provided at an equal angle.

(11) The analog angle sensor accuracy correction program described in any one of (1) to (9), characterized in that a servo driver or computer is caused to execute a count judging step for regarding completion of the area correction value updating step on all the correction areas of the correction table as one entire correction value updating process, presetting the number of times the entire correction value updating process should be executed and judging whether or not the count has been reached.

(12) The analog angle sensor accuracy correction program described in (11), characterized in that when the set number of times the entire correction value updating process should be executed is reached in the count judging step, the correction table is saved in a non-volatile memory.

(13) A servo driver or computer readable recording medium in which the analog angle sensor accuracy correction program described in any one of (1) to (12) is recorded.

(14) A servo driver storing the analog angle sensor accuracy correction program described in any one of (1) to (12) or capable of executing the program.

(15) An analog angle sensor accuracy correction method for servo motor control executable by a servo driver or computer, the method being characterized by using a correction table having a structure in which modifiable correction values to be used for correction calculations on a target speed value which will be described later are arranged for each of correction areas resulting from dividing a motor axis rotation angle range to be used as a unit of correction value updating processing which will be described later and including an area confirmation necessity judging step for judging whether or not correction value updating processing in the current correction area detected based on position information from an angle sensor is necessary, an area correction value updating step for comparing, when a confirmation in the correction area is judged to be necessary in the area confirmation necessity judging step, an initially commanded motor rotation speed, that is, a commanded speed value with a speed targeted for correction processing, that is, a target speed value and applying correction value updating processing to the correction values set in the correction areas in the correction table according to the result thereof, a speed correction step for applying a correction calculation to the target speed value using the correction value updated in the area correction value updating step, and an area processing situation judging step for judging the execution situation of the step for applying the area correction value updating step to all correction areas of the correction table.

(16) The analog angle sensor accuracy correction method described in (15) characterized by allowing a servo driver or computer to execute a count judging step for regarding completion of the area correction value updating step on all the correction areas of the correction table as one entire correction value updating process, presetting the number of times the entire correction value updating process should be executed and judging whether or not the count has been reached.

(17) The analog angle sensor accuracy correction method described in (16), characterized in that when the set number of times the entire correction value updating process should be executed is reached in the count judging step, the correction table is saved in a non-volatile memory.

(18) A speed correction step, that is, speed correction algorithm, used for the analog angle sensor accuracy correction program described in (8), which can also be used to calculate a speed during normal servo control on a servo motor.

That is, a typical example of the present invention basically performs, for all angle areas, processes of executing speed control using a speed command at a certain speed, then incorporating a calculated motor speed value for each angle range (angle area) resulting from dividing a physical motor rotation angle into a plurality of areas and modifying the correction value in the angle area by a micro value from a difference between this value and a commanded speed and performing such a series of correction value modification processes a plurality of times to thereby determine a correction value.

Furthermore, when a normal speed calculation is carried out, suppose a conventional calculated speed value is multiplied by a correction value of the corresponding motor angle area and a corrected calculated value is calculated. Furthermore, suppose the present invention is designed not to produce any difference between the actual motor speed and the calculated speed value when calculating a correction value.

According to the analog angle sensor accuracy correction program, correction method, recording medium and servo driver of the present invention configured as described above, it is possible for an analog angle sensor such as a resolver used to control a motor such as an AC servo motor to suppress variations in the calculated motor rotation speed value due to a pitch error and effectively prevent the motor control response performance from decreasing through an automatic correction of sensor accuracy. Especially, the present invention can achieve such an effect without the servo driver that drives the motor using any encoder that serves as a reference for others.

That is, the analog angle sensor accuracy correction program or the like of the present invention can reduce current ripples caused by poor sensor accuracy, set a higher control gain and thereby improve the motor control response performance.

Furthermore, the analog angle sensor accuracy correction program or the like of the present invention requires no special equipment or apparatuses to calculate a correction value and can thereby calculate a correction value at lower cost and in a short time and obtain a desired effect.

DESCRIPTION OF SYMBOLS

S0—Speed correction step (speed correction algorithm)
P1, P2, P3, P4—Steps in Speed correction step (speed correction algorithm) S0
S1—Count judging step
S2—Area confirmation necessity judging step
S3—Area correction value updating step
S31, S32, S33, S34, S35—Steps in area correction value updating step S3
S4—Area processing situation judging step
A3—Position information from angle sensor, T—Correction table,
V1—Commanded speed value, V2—Target speed value,
V9—Corrected speed
S70—Speed correction step (speed correction algorithm)
S701, S702, S703—Steps in Speed correction step (speed correction algorithm) S70
S71—Count judging step
S712—Step alter count judging step S71
S719—Correction table saving step
S72—Area confirmation necessity judging step
S73—Area correction value updating step
S731, S732, S733, S734, S735—Steps in area correction value updating step S73
S74—Area processing situation judging step
S75—Initializing step
S76—Step alter initializing step S75
81—Motor, 82—Angle sensor, 83—Motor control device (Servo driver), 84—Interface, 85—R/D conversion circuit, 86—Digital signal processor for motor control (DSP), 87—Motor drive circuit.

BEST MODE FOR CARRYING OUT THE INVENTION

With reference now to the attached drawings, the present invention will be explained in detail below.

Figure 1:
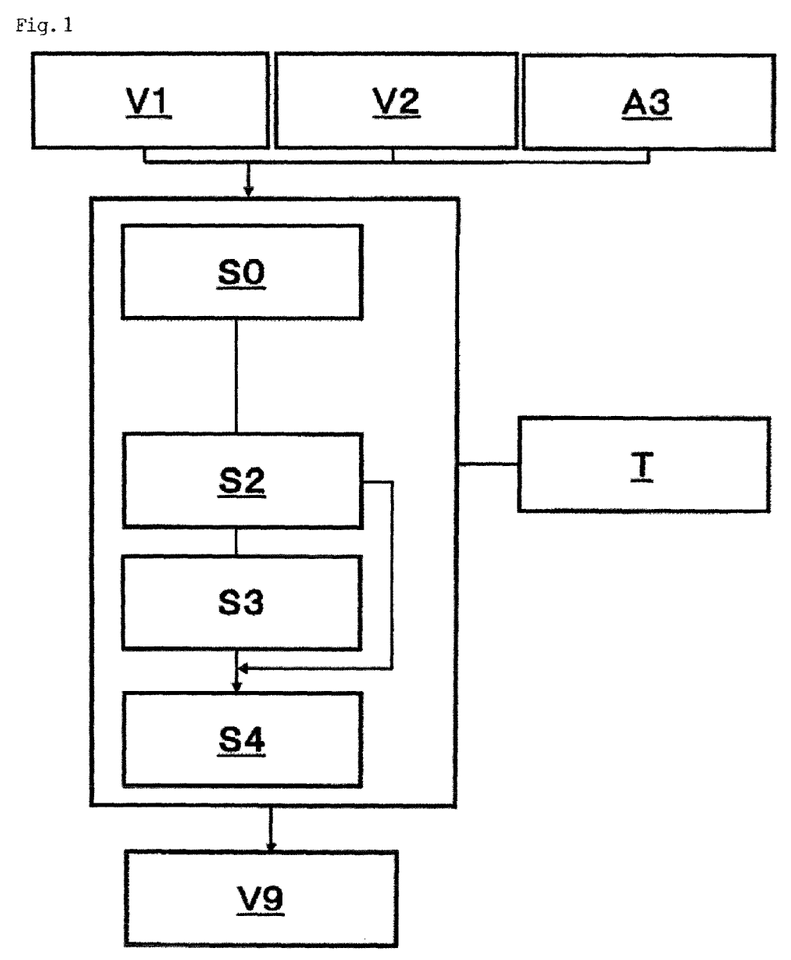
FIG. 1 is a flow chart showing basic steps of an analog angle sensor accuracy correction program of the present invention.
Figure 2:
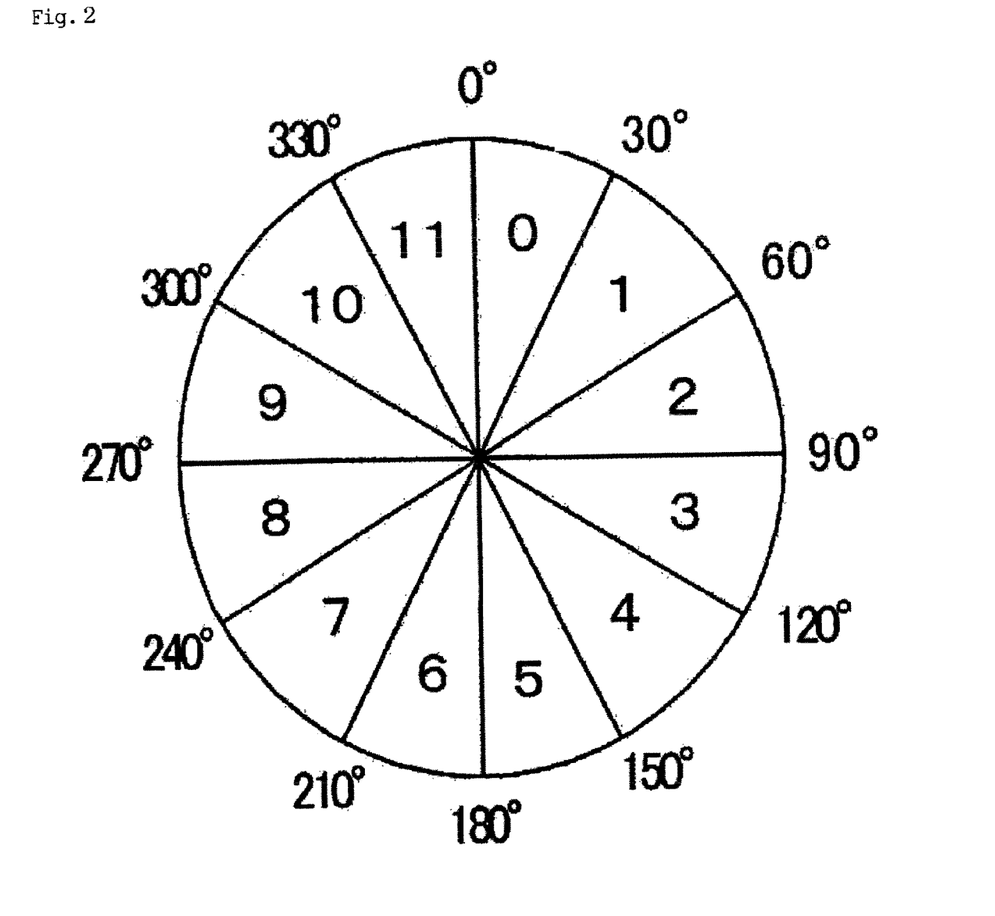
FIG. 2 is a diagram illustrating an example of correction areas used in the analog angle sensor accuracy correction program of the present invention.

FIG. 1 is a flow chart showing basic steps of an analog angle sensor accuracy correction program of the present invention. Furthermore, FIG. 2 is a diagram illustrating an example of correction areas used in the analog angle sensor accuracy correction program of the present invention and FIG. 3 is a diagram illustrating the basic configuration and an example of the actual configuration of a correction table corresponding to the correction area example in FIG. 2 used in the analog angle sensor accuracy correction program of the present invention.

Figure 3:
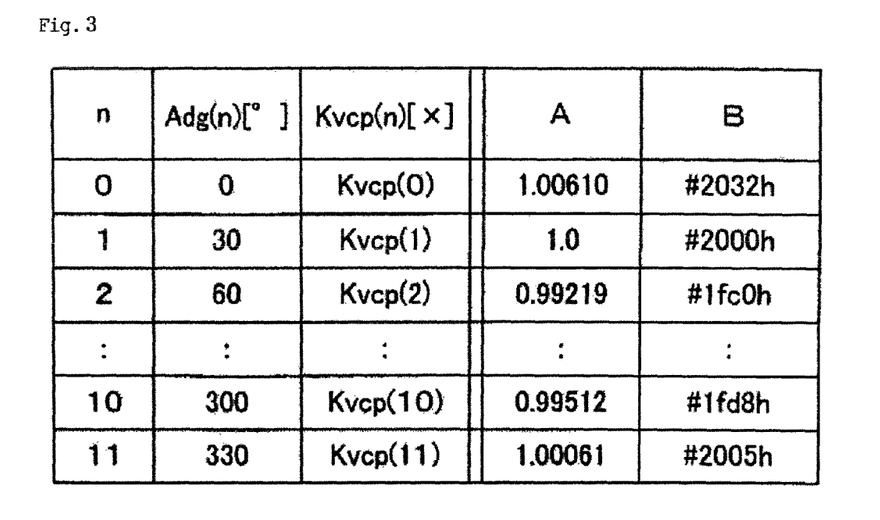
FIG. 3 is a diagram illustrating the basic configuration and an example of the actual configuration of a correction table corresponding to the correction area example in FIG. 2 used in the analog angle sensor accuracy correction program of the present invention.

In FIG. 3, the left side shows the basic configuration of correction table, and the right side shows the example of the actual configuration.

First, the basic principles of the program of the present invention will be explained centered on FIG. 1, followed by explanations of a more specific configuration.

As shown in FIG. 1 or the like, the basic principle and configuration of the analog angle sensor accuracy correction program of the present invention lie in that it is a program that causes a servo driver or computer to use a correction table T having a structure in which modifiable correction values to be used for correction calculations on a target speed value V2 are arranged for each of correction areas resulting from dividing a motor axis rotation angle range to be used as a unit of correction value updating processing and execute an area correction value updating step S3 for comparing an initially commanded motor rotation speed, that is, a commanded speed value V1 with a speed targeted for correction processing, that is, a target speed value and applying correction value updating processing to correction values set in the correction areas in the correction table T according to the result thereof, a speed correction step S0 for applying a correction calculation to the target speed value V2 using the correction value updated in the area correction value updating step S3, and an area processing situation judging step S4 for judging the execution situation of the step for applying the area correction value updating step S3 to all the correction areas of the correction table T.

By executing this analog angle sensor accuracy correction program having such a configuration, the servo driver or computer incorporating this program executes the following steps. That is, in the area correction value updating step S3, an initially commanded motor rotation speed, that is, a commanded speed value V1 is compared with a speed targeted for correction processing, that is, a target speed value V2, correction value updating processing is carried out on the correction value set in the correction area in the correction table according to the result, furthermore in the speed correction step S0, a correction calculation is carried out on the target speed value V2 using the correction value updated in the area correction value updating step S3, then in the area processing situation judging step S4, the execution situation of the area correction value updating step S3 is judged and the step S3 is applied to all the correction areas of the correction table T.

As shown in FIG. 1, the program of the present invention can also be configured such that an area confirmation necessity judging step S2 is further provided for judging whether or not correction value updating processing is necessary in the current correction area detected based on position information from an angle sensor A3 and that the area correction value updating step S3 is executed when confirmation in the correction area is judged to be necessary in the area confirmation necessity judging step S2.

In such a configuration, in the area confirmation necessity judging step S2, it is judged whether or not correction value updating processing is necessary in the current correction area detected based on the position information by the angle sensor A3 and, when confirmation in the correction area is judged to be necessary, the area correction value updating step S3 is executed.

FIG. 2 and subsequent figures will be explained. FIG. 2 shows a case with a division number Ndiv=12, that is, an example where the motor axis angle is divided into 12 equal portions, but the present invention is not limited to this and by no means excludes other division numbers or division into unequal portions. However, it is extremely preferable from the standpoint of correction processing that each area be divided into equiangular portions. Furthermore, since setting a relatively large number of correction areas also allows the sensor accuracy correction processing of the present invention to be carried out elaborately, a division number of correction areas of at least two or three is preferably provided.

Furthermore, as shown in the diagram illustrating the correction table in FIG. 3, suppose a correction area number is n, an angle between a reference position and each correction area is area interpolation angle $Adg(n)[°]$, a modifiable correction value in each correction area is $Kvcp(n)$ [times] and minimum resolution is Klsb. Here, the minimum resolution Klsb represents resolution of the correction value $Kvcp(n)$ and the smaller this value, the higher accuracy correction is possible.

Furthermore, the physical value of Kvcp(n) shown in the column A in FIG. 3 represents the multiple to which the correction value Kvcp(n), which is multiplied by the calculated speed value when a speed correction is calculated, is physically equivalent and there is a relationship:

speed after correction [rpm]=physical value of *Kvcp* (*n*)×speed before correction [rpm].

Likewise, shown in the column B in FIG. 3 represents the actual data refers to a numerical value of the correction data of Kvcp(n) handled by software and the value of "1" has a weight of 1/Klsb. That is, when the actual data of Kvcp(n)=Klsb, the physical value of Kvcp(n) is 1×.

Likewise, the example of the actual data shows an example of the relationship between the physical value of Kvcp(n) and the actual data of Kvcp(n).

FIG. 3 shows the case of minimum resolution Klsp=2^13.

These figures will be used again in the later explanations.

Furthermore, the correction values initially set in the correction table in FIG. 3 may be set as appropriate, but they may also be limited to numbers from 0 to 2 inclusive. Furthermore, it is also possible to limit to a configuration that four or more correction areas are provided and all correction areas are provided equiangularly.

Figure 4:
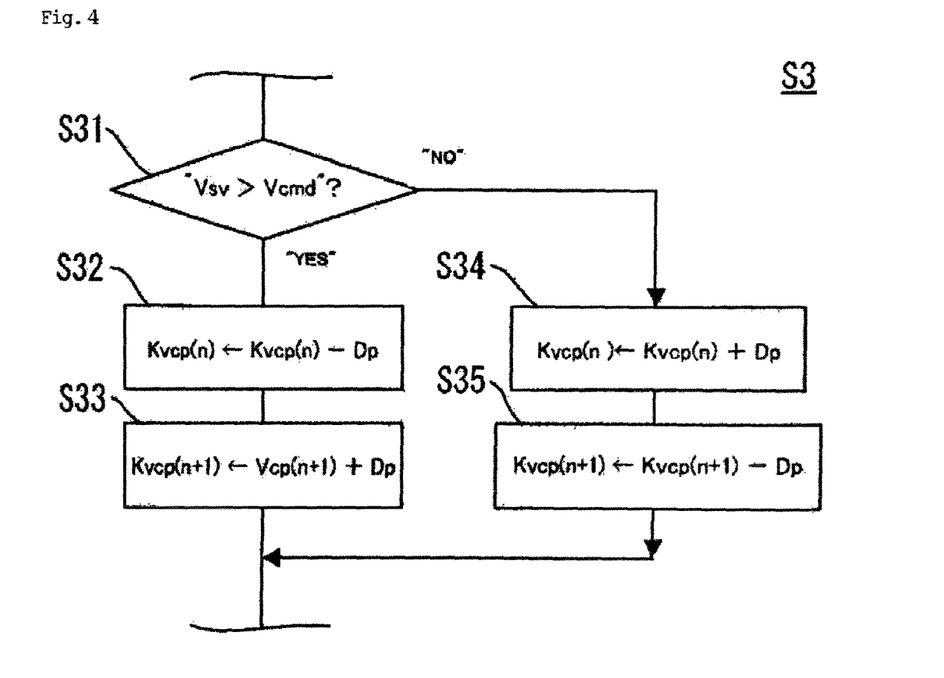
FIG. 4 is a flow chart more specifically illustrating a configuration example of the area correction value updating step in the analog angle sensor accuracy correction program of the present invention.

FIG. 4 is a flow chart more specifically illustrating a configuration example of the area correction value updating step of the analog angle sensor accuracy correction program of the present invention. As illustrated, in the area correction value updating step S3 of the program of the present invention, suppose correction value updating processing is performed on the current correction area and another correction area having a certain relationship with this.

That is, corrections in a plurality of correction areas are made in one area correction value updating step S3 and moreover the correction areas to be the correction targets are mutually selected and specified based on a certain relationship, and therefore it is possible to improve the efficiency of correction work. This certain relationship can be simply made into a relationship between two mutually adjacent correction areas.

Furthermore, the correction value updating processing carried out in the area correction value updating step S3 can be made into processing in which a specific unit constant is added/subtracted to/from the previously set correction value according to each correction area. Such a method can improve the efficiency of the correction value updating processing and is effective in suppressing variations in the calculated motor rotation speed value.

As shown above, the analog angle sensor accuracy correction program of the present invention can specifically configure the correction value updating processing carried out in the area correction value updating step S3 as processing that adds a specific unit constant to one of the current correction area and one correction area adjacent to this and adds a number with a sign opposite thereto to the other.

That is, the processing in the correction value updating step S3 can be configured as the following processing as specifically shown in the example in FIG. 4.

In the current correction area n, it is judged whether or not a target speed value Vsv is greater than commanded speed value Vcmd or not (step S31), when "Yes", i.e., when the target speed value Vsv is greater than commanded speed value V cmd in the current correction area n, "|specific unit constant|" is added to the correction value Kvcp(n) previously set in the correction area n (step S32) "Dp" is added to Kvcp(n) in the figure. In a correction area n+1 adjacent to this, "+|specific unit constant|" is added to the previously set correction value Kvcp(n+1) (step S33) "+Dp" is added to Kvcp (n+1) in the figure.

On the other hand, "No", i.e., when the target speed value Vsv is smaller than the commanded speed value Vcmd, "+|specific unit constant|" is added to the correction value previously set in the correction area n (step S34). "+Dp" is added to Kvcp(n) in the figure. "−|specific unit constant|" is added to the correction n+1 adjacent to this (step S35). "−Dp" is added to Kvcp(n+1) in the figure. In this way, the correction value updating processing can be configured as linked processing based on a specific unit constant.

When the correction value updating processing in the current correction area is completed in the correction value updating step S3, in the following area processing situation judging step S4, the situation of execution of the area correction value updating step S3, that is, the presence/absence of execution is judged, steps in this program are repeated until the correction value updating step S3 is applied to all the correction areas and finally the step S3 is applied to all the correction areas of the correction table.

By configuring the correction value updating processing in the correction value updating step S3 in this way, the multiplication value for all correction values becomes 1.0×, and therefore there is no more variation in the average of the calculated motor rotation speed value and current ripples can be reduced and the control gain can be set higher and the motor control response performance can thereby be improved.

Figure 5:
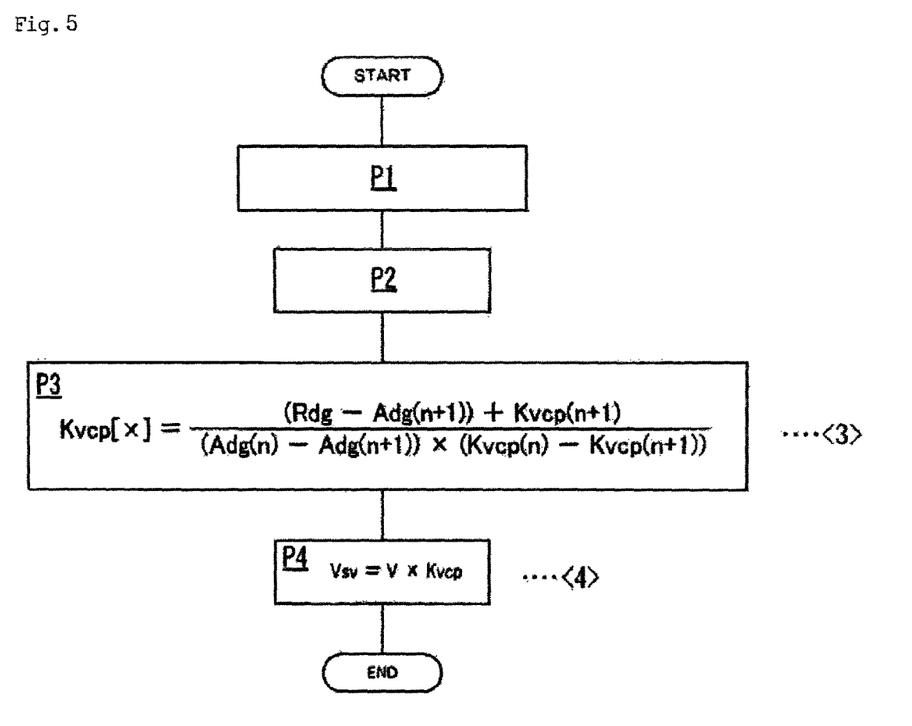
FIG. 5 is a flow chart showing a configuration example of the speed correction step of the analog angle sensor accuracy correction program of the present invention.

FIG. 5 is a flow chart showing a configuration example of the speed correction step of the analog angle sensor accuracy correction program of the present invention. As illustrated, the speed correction step (S0) is a technique of calculating the correction speed using the aforementioned correction table and can be more specifically configured as follows.

That is, this step can be configured as a step of calculating a speed correction value variable Kvcp based on each correction value Kvcp(n), Kvcp(n+1) subjected to correction value updating processing in the current correction area n and adjacent correction area n+1, area interpolation angle Adg(n) which is an angle of interval between both correction areas n, n+1 and the current motor axis angle Rdg obtained from the position information by the angle sensor and calculating a corrected calculation speed Vsv by multiplying the conventional calculation speed variable V obtained from the position information by the angle sensor by the speed correction value variable Kvcp.

Figure 6:
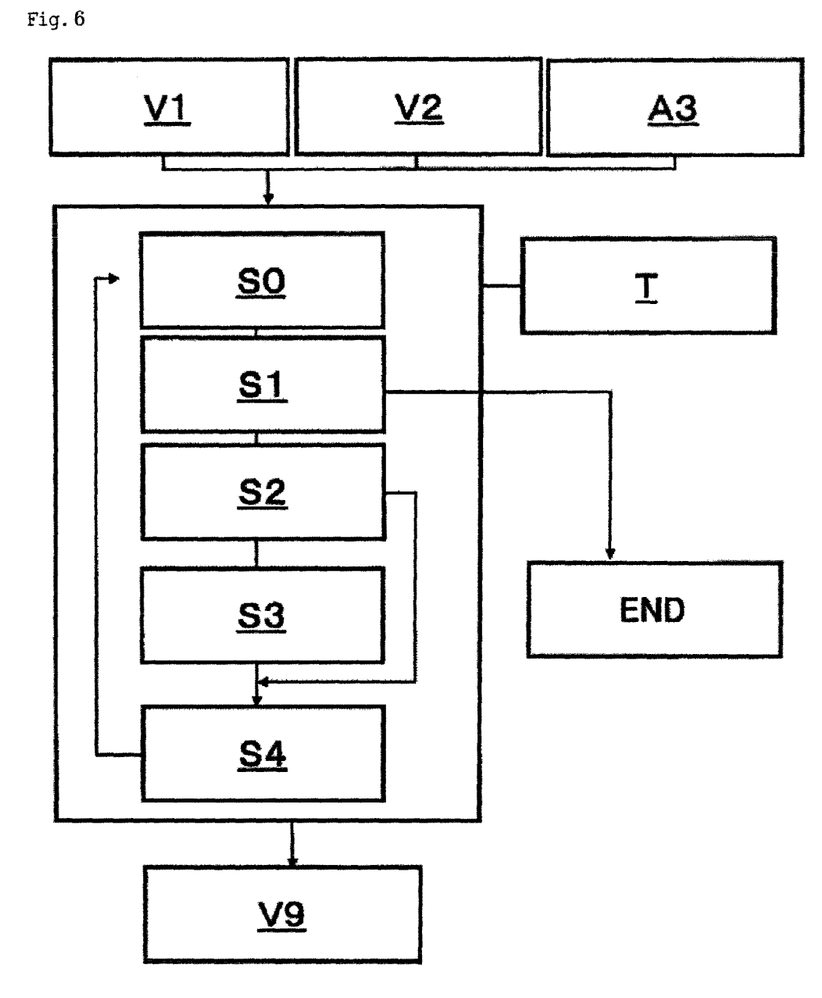
FIG. 6 is a flow chart showing another example of the basic steps of the analog angle sensor accuracy correction program of the present invention.
Figure 7:
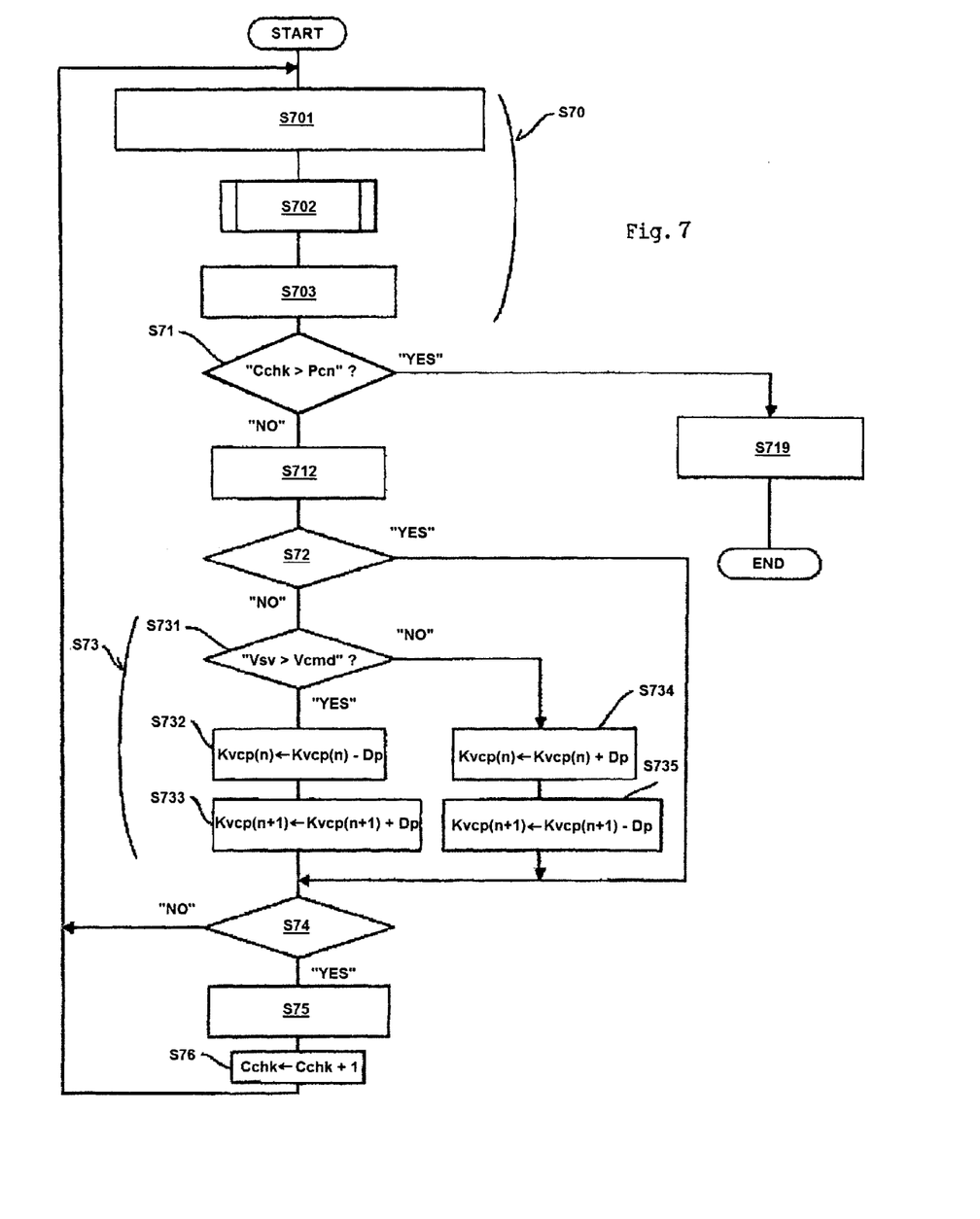
FIG. 7 is a flow chart showing an embodiment of the analog angle sensor accuracy correction program of the present invention.

As shown in FIG. 1 and FIGS. 6, 7 which will be shown later, the illustrated flow may be used not only for the analog angle sensor accuracy correction program of the present invention but also to calculate the speed during normal servo control.

The step shown in FIG. 5 will be described in more detail.

In step PI, The conventional calculation speed V[rpm] is calculated from the angle sensor information, and in step P2, area number n is calculated from the same, and in step P3, the speed correction value of the current motor axis angle is calculated by interpolation from the correction table value K vcp(n) of the current area n, correction table value K vcp(n+1) of the adjacent area n+1 and area interpolation angle Adg(n) shown in FIG. 3 (Expression <3> in the figure). Here, the area interpolation angle Adg(n) is preferably the central angle of the correction area, but this will complicate the interpolation calculation, and therefore the area interpolation angle Adg(n) is set at an end point of the interpolation area. Even so, if the division number Ndiv of the correction area is large enough, there is no problem in actuality.

Description of symbols is as follows;
V: Conventional calculation speed [rpm] variable
Vsv: Corrected calculation speed value [rpm] variable
Kvcp(n): Correction table value (n=area number) [times] variable
Kvcp: Speed correction value [times] variable
Rdg: Current motor axis angle [0] variable
Adg(n): Area interpolation angle (n=area number) [0] constant.

Though the explanation is repeated, a corrected calculation speed Vsv can be calculated by multiplying the speed correction value Kvcp calculated in this way by the calculated speed V[rpm] in step P4 (Expression <4> in the figure).

FIG. 6 is a flow chart showing another example of the basic steps of the analog angle sensor accuracy correction program of the present invention. As shown in the figure, the program in this example has a configuration with a count judging step S1 in addition to the configuration shown in FIG. 1. Here, the count judging step S1 is a step of regarding the completion of the area correction value updating step S3 on all the correction areas of the correction table as one entire correction value updating process, presetting a count of the number of times the entire correction value updating process should be carried out and judging whether or not the count has been reached.

In the figure, the count judging step S1 is provided upstream of all of the area confirmation necessity judging step S2, area correction value updating step S3 and area processing situation judging step S4 or downstream of the speed correction step S0, but this step is not limited to as such. Point is, the count judging step S1 may be provided at any position in the flow as appropriate if this allows such a setting that when it is judged whether or not the actual correction value updating process count has reached the preset entire correction value updating process count, and if not reached, the area correction value updating processing step S3 is repeated until the count is reached and if reached, predetermined end processing is carried out.

The ending processing when the entire correction value updating process count set in the count judging step S1 is reached may be made into processing in which the current correction table is saved in a non-volatile memory.

FIG. 7 is a flow chart showing an embodiment of the analog angle sensor accuracy correction program of the present invention. This embodiment of the present invention will be explained using this figure and above FIG. 5 or the like.
Description of symbols in FIG. 7 is as follows;
Vcmd: Speed command [rpm] constant
Vsv: Corrected calculation speed value [rpm] variable
Pcn: Correction value update ending count [times] constant
Cchk: Correction value update count [times] variable
Kvcp(n): Correction table value (n=area number) [times] variable
Dp: Correction value update unit [times] constant.

As shown in FIG. 2, correction areas resulting from dividing the angle of one rotation of the motor by a constant Ndiv are set first. In this example, Ndiv=12, that is, a total of 12 areas (angle ranges) are provided. A correction table having a structure with correction values Kvcp(n) arranged in the respective angle ranges is prepared (FIG. 3).

The physical value of the correction value Kvcp(n) is set to within a range of 0 to 2 times. That is, the correction value Kvcp(n) is fixed-point data having physical weights of 0 to 2 times and here, the minimum resolution of the correction value Kvcp(n) (hereinafter also simply referred to as "resolution") is defined as Klsb. As described above, the smaller this value, the higher accuracy correction is possible. Suppose the initial value of the resolution Klsb is set to 1×.

After setting the correction areas and preparing the correction table, in speed correction step S70, the motor speed is controlled to a constant speed Vcmd as shown in FIG. 7 first (S701). The speed control is performed using a calculation speed after a correction (hereinafter referred to as "calculated corrected speed value variable") Vsv[rpm] using a correction value updated every time (hereinafter referred to as "correction table value" or also referred to as "correction table value variable") Kvcp(n) (FIG. 5).

Consequently in step S701, speed control is performed as the equation below is held; speed command constant Vcmd [rpm]=corrected calculation speed value Vsv [rpm] variable.

A new calculated corrected speed value Vsv is obtained through a "speed correction algorithm" in a speed correction step S702 in FIG. 7 (step S703). In this embodiment, a count judging step S71 is provided prior to an area confirmation necessity judging step S72 which will be described later. Here, a correction value update count Cchk is compared with a correction value update ending count (or "correction value update ending count constant") Pcn and if the former is greater than the latter, the correction table is saved in the non-volatile memory (step S719) and the operation of the servo driver or the like based on this program ends. On the other hand, if the former is equal to or smaller than the latter, the flow moves to the subsequent steps.

Now this is only an example, the judging method in count judging step S71 is not limited to the above-mentioned one. For instance, following method is also possible. Consequently, a correction value update count Cchk is compared with a correction value update ending count (or "correction value update ending count constant") Pcn, and if the former is equal to or greater than the latter, the correction table is saved in the non-volatile memory and the operation of the servo driver or the like based on this program ends. On the other hand, if the former is smaller than the latter, the flow moves to the subsequent steps.

Furthermore, The position of the step S71 is not limited to the embodiment as described above.

Prior to a correction value updating step S73, it is searched from the angle sensor information in which correction area n of the correction table the current motor axis angle exists (S712). A correction value updating step for the correction table value Kvcp(n) in the searched correction area n is then performed.

More specifically, in the area confirmation necessity judging step S72, it is judged whether or not the searched correction area n is a correction area already subjected to confirmation/correction value updating first. When "Yes", i.e., the correction area n is already confirmed/updated, the next correction value updating step S73 is bypassed and the flow moves to an area processing situation judging step S74. i.e., the area that has been already checked is no longer checked. When "No", i.e., the correction area n is not confirmed or updated yet, the flow moves to the next correction value updating step S73.

In the correction value updating step S73, the calculated corrected speed value Vsv[rpm] calculated in the speed correction step S70 is compared with the speed commanded value Vcmd[rpm] (step S731), for instance likewise shown in the figure, and when the calculated speed value Vsv is greater than the commanded value Vcmd ("Yes"), the corrected value update unit constant −Dp is added to the correction table value Kvcp(n) (step S732) and on the other hand when Vsv is smaller ("No"), +Dp is added (step S734). Furthermore, the value of the correction value update unit constant which has been added to the correction table value Kvcp(n) of the correction area n with an inverted sign is added to the correction table value Kvcp(n+1) which corresponds to the correction area n+1 adjacent to the correction area n whose correction value has been updated (step S733, step S735). Since such linked processing causes the multiplication values of all the correction values to become 1.0×, the variation in the average of the calculated motor rotation speed value is suppressed.

The smaller the correction value update unit constant Dp, the higher is the calculation accuracy of the correction value. However, since the converging time of the correction value increases at the same time, it is preferable to set an optimum value in a trade-off between the converging time and correction calculation accuracy.

By setting a large initial value for the correction value update unit constant Dp and gradually decreasing the correction value update unit constant Dp as the correction value update count Cchk increments, it is possible to shorten the converging time while keeping high the correction calculation accuracy.

The correction table value Kvcp(n) is calculated in the correction value updating step S73 every servo processing period and the calculation is repeated until calculations of all the correction areas are completed.

Whether or not confirmation/correction value updating processing has been performed in all the correction areas is judged in the area processing situation judging step S74 and when "No", i.e., the judgment result shows that there are still non-confirmed or non-processed correction areas, the flow returns to the previous steps to repeat the flow of this program. Processing is then performed in the same steps from the beginning again and repeated until this reaches the set correction value update ending count Pcn.

On the other hand, when "Yes", i.e., the judgment result shows that all the correction areas have already been subjected to confirmation/correction value updating processing, this means that one entire correction value updating process has been performed, area-confirmed information is initialized (step S75), the correction value update count variable Cchk is incremented by 1 (step S76) and the flow returns to the step before the flow of this program.

The correction value update ending count Pcn can be set to an arbitrary value, but it is preferable to set a count enough for the value of the calculated corrected speed value Vsv to converge.

Since the correction area n to be subjected to a correction value calculation varies randomly every servo processing period, the correction areas for which calculation processing has already been completed may possibly be searched before the correction value updating processing on all the correction areas is completed. However, in that case, processing is performed in the area confirmation necessity judging step S72 as described above, the correction table value Kvcp(n) is never updated redundantly.

Setting the speed commanded value Vcmd[rpm] when carrying out a correction calculation to a value which is not divisible by the time of the servo processing period can reduce the probability that the same correction area may be repeatedly searched.

Furthermore, speed control during a correction value calculation is performed using the corrected calculation speed Vsv calculated using the correction table value Kvcp(n) which is updated every time.

The accuracy of the speed correction value can be increased by decreasing the division number Ndiv of the correction areas and minimum resolution Klsb of the correction table value. Therefore, it is preferable to set a largest possible value in a trade-off with the memory capacity of the servo driver or a calculation apparatus of a computer which performs servo control.

The analog angle sensor accuracy correction program of the present invention explained so far may be stored in a servo driver or computer readable recording medium or directly stored in the servo driver or the like.

INDUSTRIAL APPLICABILITY

According to the analog angle sensor accuracy correction program of the present invention or the like, it is possible to reduce current ripples due to poor sensor accuracy, thereby set a higher control gain and improve the motor control response performance. Since the present invention requires no special equipment or apparatus or the like, can achieve a desired effect at low cost and in a short time, it is very useful in motor control and related fields.

What is claimed:

1. An analog angle sensor accuracy correction processor executable instructions for servo motor control when executed by a servo driver or computer, the processor executable instructions causing a servo driver or computer to use a correction table having a structure in which modifiable correction values to be used for correction calculations on a target speed value are arranged for each of correction areas resulting from dividing a motor axis rotation angle range to be used as a unit of correction value updating processing and execute:

an area correction value updating step for comparing an initially commanded motor rotation speed, that is, a commanded speed value with a speed targeted for correction processing, that is, a target speed value and applying correction value updating processing to the correction values set in the correction areas in the correction table according to the result thereof;

a speed correction step for applying a correction calculation to the target speed value using the correction value updated in the area correction value updating step; and an area processing situation judging step for judging the execution situation of the step for applying the area correction value updating step to all correction areas of the correction table.

2. The analog angle sensor accuracy correction processor executable instructions according to claim 1, wherein four or more of the correction areas are provided and all correction areas are provided at an equal angle.

3. A servo driver or computer readable medium in which the analog angle sensor accuracy correction instructions according to claim 1 are stored when executed by a computer.

4. A servo driver storing the analog angle sensor accuracy correction processor executable instructions according to claim 1 or capable of executing the processor executable instructions.

5. The analog angle sensor accuracy correction processor executable instructions according to claim 1, wherein a servo driver or computer is caused to execute a count judging step for regarding completion of the area correction value updating step on all the correction areas of the correction table as one entire correction value updating process, presetting the number of times the entire correction value updating process should be executed and judging whether or not the count has been reached.

6. The analog angle sensor accuracy correction processor executable instructions according to claim 5, wherein when the set number of times the entire correction value updating process should be executed is reached in the count judging step, the correction table is saved in a non-volatile memory.

7. The analog angle sensor accuracy correction processor executable instructions according to claim 1, wherein in the area correction value updating step, correction value updating processing is applied to the current correction area and another correction area having a certain relationship therewith.

8. The analog angle sensor accuracy correction processor executable instructions according to claim 7, wherein the correction value initially set in the correction table is a number of 0 to 2 inclusive.

9. The analog angle sensor accuracy correction processor executable instructions according to claim 7, wherein the correction value updating processing carried out in the area correction value updating step is processing of adding/subtracting a specific unit constant to/from a previously set correction value according to each correction area.

10. The analog angle sensor accuracy correction processor executable instructions according to claim 9, wherein the other correction area is one correction area adjacent to the current correction area.

11. The analog angle sensor accuracy correction processor executable instructions according to claim 10, wherein the correction value updating processing is processing of adding the specific unit constant to one of the correction area adjacent to the current correction area and adding a number with a sign opposite thereto to the other.

12. The analog angle sensor accuracy correction processor executable instructions according to claim 11, wherein the correction value updating processing is processing that adds, when the target speed value is greater than the commanded speed value in the current correction area, minus specific unit constant to the correction value previously set in the correction area and adds plus specific unit constant to a correction area adjacent thereto, and further adds, when the target speed value is smaller than the commanded speed value, plus specific unit constant to the correction value previously set in the correction area and adds minus specific unit constant to the correction area adjacent thereto.

13. The analog angle sensor accuracy correction processor executable instructions according to claim 10, wherein the speed correction step is processing that calculates a speed correction value variable Kvcp based on each correction value subjected to correction value updating processing in the current correction area and adjacent correction area, an area interpolation angle which is an angle of interval between both correction areas and a current motor axis angle obtained from position information from the angle sensor, multiplies a conventional calculation speed variable V obtained from the position information from the angle sensor by the speed correction value variable Kvcp and calculates a corrected calculation speed Vsv.

14. A speed correction step, that is, speed correction algorithm, used for the analog angle sensor accuracy correction program according to claim 13, which can also be used to calculate a speed during normal servo control on a servo motor.

15. An analog angle sensor accuracy correction processor executable instructions for servo motor control when executed by a servo driver or computer, the processor executable instructions causing a servo driver or computer to use a correction table having a structure in which modifiable correction values to be used for correction calculations on a target speed value are arranged for each of correction areas resulting from dividing a motor axis rotation angle range to be used as a unit of correction value updating processing and execute:

an area confirmation necessity judging step for judging whether or not correction value updating processing in the current correction area detected based on position information from an angle sensor is necessary;

an area correction value updating step for comparing, when a confirmation in the correction area is judged to be necessary in the area confirmation necessity judging step, an initially commanded motor rotation speed, that is, a commanded speed value with a speed targeted for correction processing, that is, a target speed value and applying correction value updating processing to the correction values set in the correction areas in the correction table according to the result thereof;

a speed correction step for applying a correction calculation to the target speed value using the correction value updated in the area correction value updating step; and an area processing situation judging step for judging the execution situation of the step for applying the area correction value updating step to all correction areas of the correction table.

16. An analog angle sensor accuracy correction method for servo motor control when executed by a servo driver or computer, the method using a correction table having a structure in which modifiable correction values to be used for correction calculations on a target speed value are arranged for each of correction areas resulting from dividing a motor axis rotation angle range to be used as a unit of correction value updating processing and comprising:

an area confirmation necessity judging step for judging whether or not correction value updating processing in the current correction area detected based on position information from an angle sensor is necessary;

an area correction value updating step for comparing, when a confirmation in the correction area is judged to be necessary in the area confirmation necessity judging step, an initially commanded motor rotation speed, that is, a commanded speed value with a speed targeted for correction processing, that is, a target speed value and applying correction value updating processing to the correction values set in the correction areas in the correction table according to the result thereof;

a speed correction step for applying a correction calculation to the target speed value using the correction value updated in the area correction value updating step; and an area processing situation judging step for judging the execution situation of the step for applying the area correction value updating step to all correction areas of the correction table.

17. The analog angle sensor accuracy correction method according to claim 16, allowing a servo driver or computer to execute a count judging step for regarding completion of the area correction value updating step on all the correction areas of the correction table as one entire correction value updating process, presetting the number of times the entire correction value updating process should be executed and judging whether or not the count has been reached.

18. The analog angle sensor accuracy correction method according to claim 17, wherein when the set number of times the entire correction value updating process should be executed is reached in the count judging step, the correction table is saved in a non-volatile memory.

* * * * *